(12) United States Patent
Isobe et al.

(10) Patent No.: US 6,979,048 B2
(45) Date of Patent: Dec. 27, 2005

(54) CAR DOOR STRUCTURE

(75) Inventors: Masami Isobe, Hatsukaichi (JP); Shinichiro Emori, Hatsukaichi (JP)

(73) Assignees: Nishikawa Rubber Co., Ltd., Hiroshima (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/887,712

(22) Filed: Jul. 8, 2004

(65) Prior Publication Data

US 2005/0073171 A1 Apr. 7, 2005

(30) Foreign Application Priority Data

Oct. 6, 2003 (JP) .............................. 2003-347504

(51) Int. Cl.⁷ ................................................ B60J 5/00
(52) U.S. Cl. ............................... 296/146.7; 296/146.5; 296/39.1
(58) Field of Search ......................... 296/146.7, 39.1, 296/146.5

(56) References Cited

U.S. PATENT DOCUMENTS

| | | | |
|---|---|---|---|
| 5,111,619 A * | 5/1992 | Billin et al. ................. | 49/502 |
| 6,226,927 B1 * | 5/2001 | Bertolini et al. ............. | 49/502 |
| 6,412,852 B1 * | 7/2002 | Koa et al. ................... | 296/146.7 |
| 6,676,195 B1 * | 1/2004 | Marriott et al. ............. | 296/146.7 |
| 6,814,382 B2 * | 11/2004 | Kohara et al. ............... | 296/1.03 |
| 6,890,018 B1 * | 5/2005 | Koa et al. ................... | 296/146.5 |
| 2002/0180236 A1 | 12/2002 | Blomeling et al. | |
| 2003/0001408 A1 * | 1/2003 | Hockenberry et al. ... | 296/146.7 |
| 2003/0164624 A1 * | 9/2003 | Kohara et al. .......... | 296/146.7 |
| 2004/0201246 A1 * | 10/2004 | Miyahara et al. ....... | 296/146.7 |
| 2005/0052051 A1 * | 3/2005 | Kohara et al. .......... | 296/146.7 |
| 2005/0073171 A1 * | 4/2005 | Isobe et al. ............. | 296/146.7 |
| 2005/0076594 A1 * | 4/2005 | Warner .................. | 52/459 |

FOREIGN PATENT DOCUMENTS

| | | | | |
|---|---|---|---|---|
| DE | 44 16 972 A1 | 11/1995 | | |
| EP | 1344671 A1 * | 9/2003 | ............. | B60J 5/04 |
| JP | 59-084621 A | 5/1984 | | |
| JP | 05-23376 | 6/1993 | | |
| JP | 08207572 A * | 8/1996 | ............. | B60J 5/00 |
| JP | 08207573 A * | 8/1996 | ............. | B60J 5/00 |
| JP | 10-119159 | 5/1998 | | |
| JP | 2004-058982 A | 2/2004 | | |
| JP | 2004-074818 A | 3/2004 | | |

* cited by examiner

Primary Examiner—Kiran B. Patel
(74) Attorney, Agent, or Firm—Frishauf, Holtz, Goodman & Chick, P.C.

(57) ABSTRACT

There is provided a car door structure which comprises an interior door trim 52 at an interior side of a door inner panel 11, and a noise isolation sheet 20 which is installed between the door inner panel 11 and the door trim 52, covering the door inner panel 11 partially or wholly. The edge portion of the noise isolation sheet 20 is nipped by a nip portion 40. The nip portion 40 is formed with portions of the door inner panel 11 and the door trim 52 by making the portions come closer.

8 Claims, 4 Drawing Sheets

CAR DOOR STRUCTURE

BACKGROUND OF THE INVENTION

1. Field of the Invention

This invention relates to a car door structure wherein a door trim is installed to a door inner panel, and a noise isolation sheet is installed between the door inner panel and the door trim.

2. Description of the Prior Art

As illustrated in FIG. 3, there have been a known method of isolating noise in the interior of a door 50, wherein a felt 2 or urethane is attached to the backside of an interior door trim 1 which is provided to the inner side of a door inner panel, or an urethane-made article is attached to the side of the door inner panel (See, for example, Patent Publication No. 1 and 2.).

[Patent Publication No. 1]

Japanese Examined Utility model Publication No. 5-23376

[Patent Publication No. 2]

Japanese Unexamined Patent Publication No. 10-119159

In the Patent Publication No. 1, there is disclosed a door trim which is provided with pad material made of urethane foam and the like. In the Patent Publication No. 2, there is disclosed a noise isolation cover made of urethane foam.

However, according to the above-described prior arts, the noise isolating effect is not satisfactory because the felt 2, urethane, pad material and isolation cover are all made independently and they are installed merely partially to the side of the door trim 1 or the inner side of the door inner panel.

Further, they had to be partially installed, so that there was a problem that the installation operation was troublesome.

Concerning the above-mentioned problem, the applicant of the present invention previously provided a structure wherein an isolation sheet 20 is provided between a door inner panel 11 and a door trim 12 and wherein the top end of the sheet 20 is secured to an inner weather strip 15 just like a curtain hanging from the upside to the downside (See Japanese patent application No. 2002-57777).

In this structure, the inner weather strip 15 is composed of an installation base 16, seal lip portions 17 and 18 provided up and down for elastically making contacts with a door glass 70 which slides in the upward and downward directions from inner side, and a support portion 19 which is prolonged downwardly from the installation base 16 for supporting the seal lip portions 17 and 18. There are formed a plurality of lip portions 16a and position adjustment protrusions 16b on the upper surface of the installation base 16. The installation base 16 is inserted into a concave portion 13 formed on the upper portion of the door trim 12, while each of the position adjustment protrusions 16b makes a contact with a corresponding step portion 13a for adjusting in a proper position. The door trim 12 is fixed to a door inner panel 11 with clips 30.

According to this structure, there is created two rooms X and Y between the door inner panel 11 and door trim 12 through the intermediary of the isolation sheet 20, so that the noise isolating effect improves compared to the conventional arts which are provided with a felt, urethane, pad material, noise isolation cover and the like. Further, the noise isolation sheet 20 is provided by merely hanging the sheet 20 from the upside to the downside, so that an installation operation is easy.

The door structure shown in FIG. 5 shows a sectional view along line I—I in FIG. 4. Although, this structure is such that the mounting base 16 of the inner weather strip 15 is tightly inserted into the groove 13 which is formed at the upper portion of the door trim 12, this may be structured as illustrated in FIG. 6, wherein the mounting base 36 of the inner weather strip 35 comprising the seal lip 37 is installed to the upper edge of the door inner panel 11, while the top edge of the door trim 32 is installed to the groove 33 which is formed in the inner weather strip 35.

The structure illustrated in FIG. 7 is a drawing corresponding to a sectional view along line II—II in FIG. 4, and it illustrates a car door structure the applicant of this application has previously filed (Japanese Patent Application No. 2002-233542). In this car door structure, the press portion 80 is protruded from the outer surface of the door inner panel 11 side of the door trim 52, which pushes the noise isolation sheet 20 to the surface of the door inner panel 11 at the time of an installation operation. According to this structure, since the push portion 80 is provided, a displacement or deviation of the noise isolation sheet 20 is prevented, and deterioration of the outlook of the structure is also prevented.

In recent years, sponge sheets of low density provided with the noise isolating effect as well as the waterproof effect have been deemed for use as noise isolation sheets. And, as a process of securing the edge portions (particularly the side portions and the lower end portion) of the sponge sheet, a method has been invented wherein the sponge sheet is adhered to a door inner panel with a sealer. However, since the sponge sheet is opaque, there is a problem in working properties of an installation operation that it is difficult to make sure whether or not the sponge sheet is assuredly adhered with the sealer.

In order to solve this problem, the before-mentioned structure as illustrated in FIG. 7 can be employed. However, further improvement is required to provide the method of securing the sheet more easily and assuredly performed.

Therefore, it is an object of this invention to provide a car door structure comprising a structure wherein a noise isolation sheet is easily and assuredly installed.

SUMMARY OF THE INVENTION

According to a first aspect of the invention, there is provided a car door structure wherein the structure comprises an interior door trim (52) at an interior side of a door inner panel (11), and a noise isolation sheet (20) which is installed between the door inner panel (11) and the door trim (52), covering the door inner panel (11) partially or wholly. The edge portion of the noise isolation sheet (20) is nipped by a nip portion (40). The nip portion (40) is formed with portions of the door inner panel (11) and the door trim (52) by bringing the portions closer.

According to a second aspect of the invention, there is provided a car door structure wherein the nip portion (40) comprises a protrusion (11a). The protrusion (11a) is formed by protruding a portion of the door inner panel (11) toward a side of the door trim (52).

According to a third aspect of the invention, there is provided a car door structure wherein the nip portion (40) comprises two protrusions (11a, 11a) and a concave (11b) which is positioned at a middle of the two protrusions (11a, 11a). The two protrusions (11a, 11a) are formed by protruding a portion of the door inner panel (11) toward a side of said door trim (52) forming a rough wave shape.

According to a fourth aspect of the invention, there is provided a car door structure wherein the nip portion (40) comprises two protrusions (11a, 11a) and a concave (11b)

which is positioned at a middle of the two protrusions (11a, 11a). The two protrusions (11a, 11a) are formed by protruding a portion of the door inner panel (11) toward a side of the door trim (52) forming a rough wave shape. A non-drying sealer (60) to be adhered to the noise isolation sheet (20) is fixedly adhered to the cancave (11b).

According to a fifth aspect of the invention, there is provided a car door structure as claimed in claim 5 wherein the noise isolation sheet (20) is a sponge sheet of low density provided with noise isolating effect and waterproof effect.

Each numeral in a corresponding parenthesis indicates a corresponding element or matter described in the drawings and the after-mentioned preferred embodiment of the invention.

According to the first aspect of the car door structure, the edge portion of the noise isolation sheet is nipped by the nip portion, which is formed by bringing portions of the door inner panel and the door trim closer, so that the noise isolation sheet can be installed merely by installing the door trim to the door inner panel after providing the noise isolation sheet to the door inner panel hanging from the upper portion to the lower portion thereof just like a curtain.

Therefore, an installation operation of the noise isolation sheet can be easily and assuredly completed, thereby reducing a production cost and installation operation time.

According to the second aspect of the car door structure, the nip portion comprises the protrusion which is formed by protruding a portion of the door inner panel toward the side of the door trim, so that the noise isolation sheet can be easily and assuredly nipped between the protrusion and the door trim.

According to the third aspect of the car door structure, the nip portion comprises two protrusions which are formed by protruding a portion of the door inner panel toward the side of the door trim forming the rough wave shape, so that the noise isolation sheet can be assuredly nipped at two portions.

According to the fourth aspect of the car door structure, the nip portion comprises two protrusions, which are formed by protruding a portion of the door inner panel toward the side of the door trim forming a rough wave shape, a single number of the concave which is provided at the middle of the protrusions, and the non-drying sealer which is fixedly adhered to the concave, so that the noise isolation sheet can be more firmly installed by a nipping effect of two protrusions and an adhesion effect of the non-drying sealer.

And, according to fifth aspect of the car door structure, the noise isolation sheet is a sponge sheet of low density which is provided with the noise isolating effect as well as the waterproof effect, so that the structure can be furnished with the noise isolating effect as well as the waterproof effect. Further, although this noise isolation sheet (sponge sheet) is opaque, the edge portion of the noise isolation sheet can automatically and assuredly be fixed by installing the door trim to the door inner panel, hanging the noise isolation sheet to the door inner panel from the upper side to the lower side thereof like a curtain.

Therefore, it is unneeded to make sure whether or not the isolation sheet is properly installed.

DESCRIPTION OF PREFERRED EMBODIMENT

Figure 1:
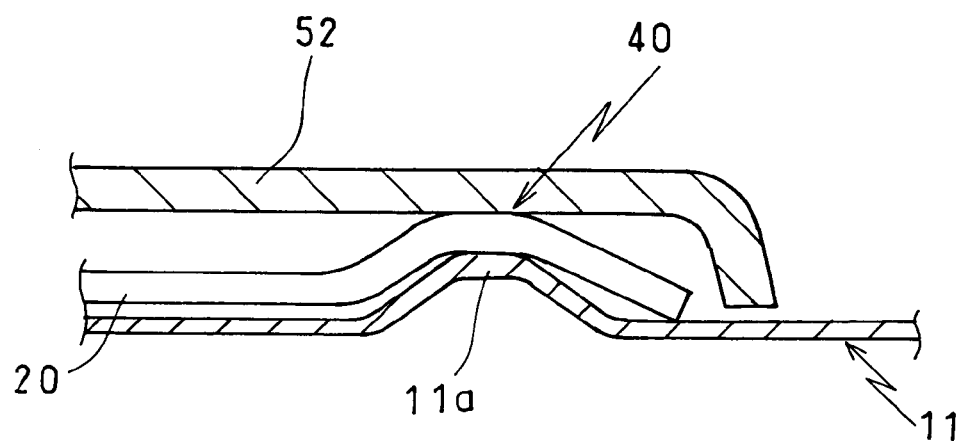
FIG. 1 is a primary portion of a car door structure according to a first preferred embodiment of the invention, and is a drawing corresponding to a sectional view along line II—II in FIG. 4.
Figure 4:
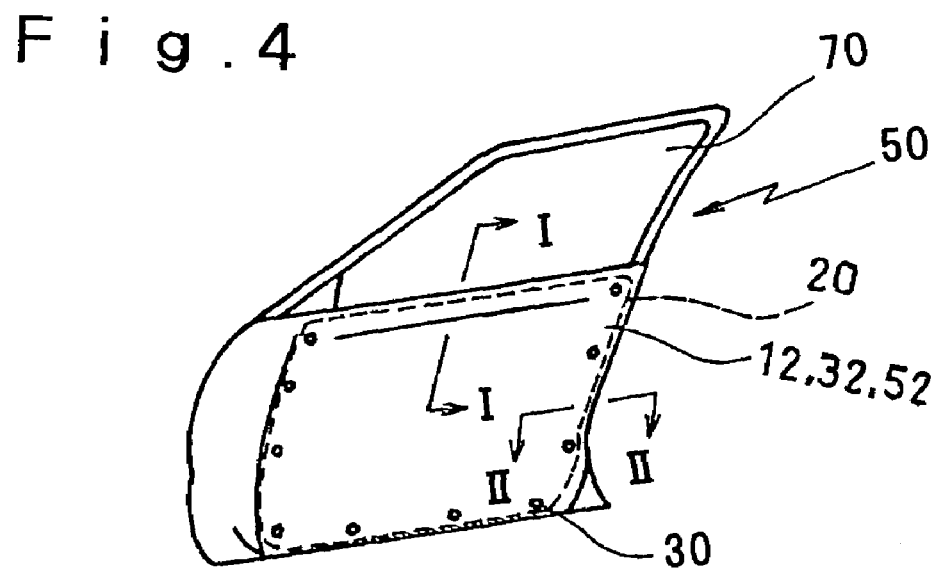
FIG. 4 is a perspective view of an outlook of a car door structure.
Figure 5:
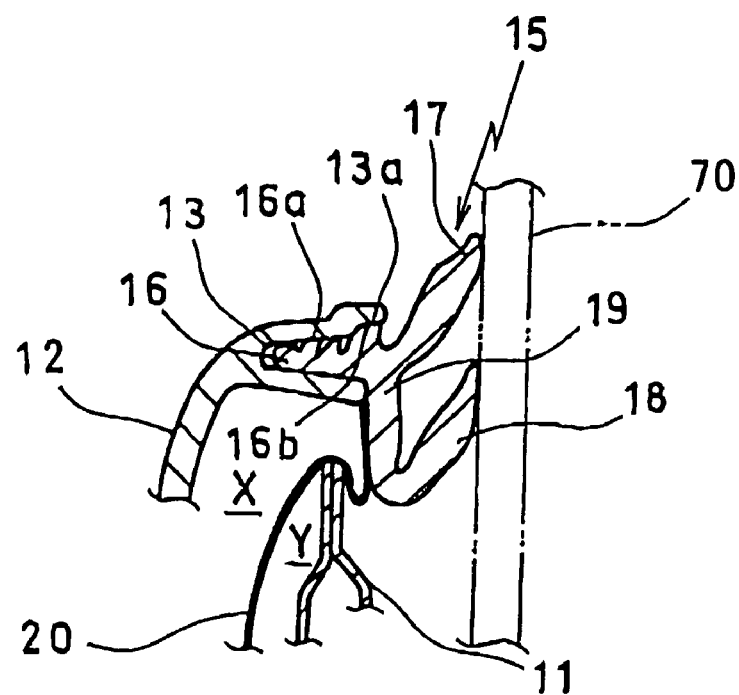
FIG. 5 is a car door structure the applicant of this invention has previously filed, and is an enlarged sectional view along line I—I in FIG. 4.
Figure 6:
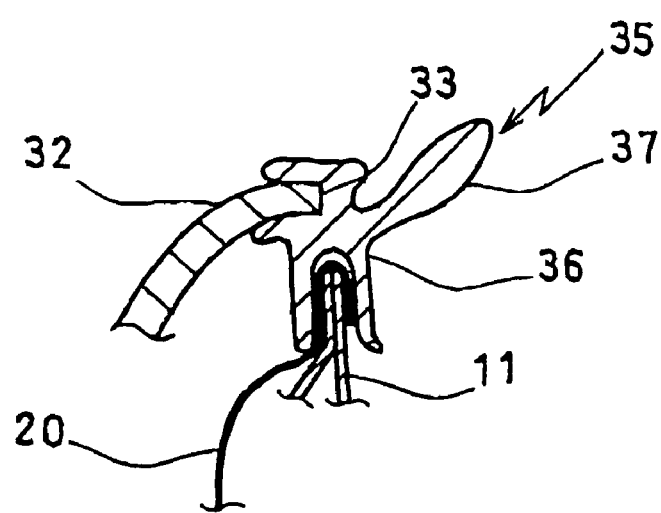
FIG. 6 is a car door structure of another type the applicant of this invention has previously filed, and is an enlarged sectional view along line I—I in FIG. 4.
Figure 7:
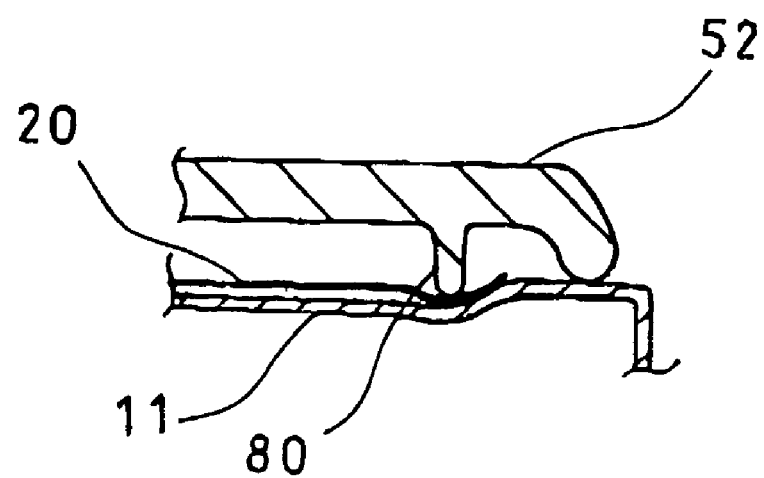
FIG. 7 is a car door structure the applicant of this invention has previously filed, and is an enlarged sectional view along line II—II in FIG. 4.

A car door structure according to a first preferred embodiment of the invention will be described hereinafter referring to FIG. 1. FIG. 1 shows a portion of a car door structure which corresponds to a sectional view along line II—II in FIG. 4.

The car door structure according to the first preferred embodiment of the invention comprises a door inner panel 11 and an interior door trim 52 which is installed to the interior side of the door inner panel 11. The structure also comprises a noise isolation sheet 20 between the door inner panel 11 and the door trim 52. The noise isolation sheet 20 covers the whole portion of the door inner panel 11.

In this structure, the edge portion (left side end, right side end and lower end) of the noise isolation sheet 20 is nipped by a nip portion 40 which is formed by bringing corresponding portions of the door inner panel 11 and the door trim 52 closer.

The nip portion 40 in this embodiment is structured with a protrusion 11a, which is formed by protruding a portion of the door inner panel 11 toward the side of the door trim 52, and a corresponding flat surface of the door trim 52, which takes place at the counter position of the protrusion 11a.

In this car door structure, the edge portion of the noise isolation sheet 20 can be assuredly nipped between the protrusion 11a and the door trim 52 by installing the noise isolation sheet 20 to the door inner panel 11 hanging from the upper side thereof to the lower side thereof like a curtain, and then, installing the door trim 52 over the door inner panel 11. (In this case, the upper end portion of the noise isolation sheet 20 can be secured to an inner weather strip 15, 35 or the upper end of the door trim 52, hanging the sheet 20 like a curtain.)

Therefore, an extra operation for particularly installing the noise isolation sheet 20 is unneeded, and thus a working properties of the installation operation improves. Further, this structure does not require any sealers so that working properties of installation operation improves and a production cost is reduced.

The noise isolation sheet 20 in this preferred embodiment is formed by a sponge sheet of low density having a density, for example, of 0.10 to 0.15, which is provided with noise isolating properties as well as waterproof properties.

Therefore, the car door structure having such noise isolation sheet 20 performs the noise isolating effect as well as the high waterproof effect.

Figure 2:
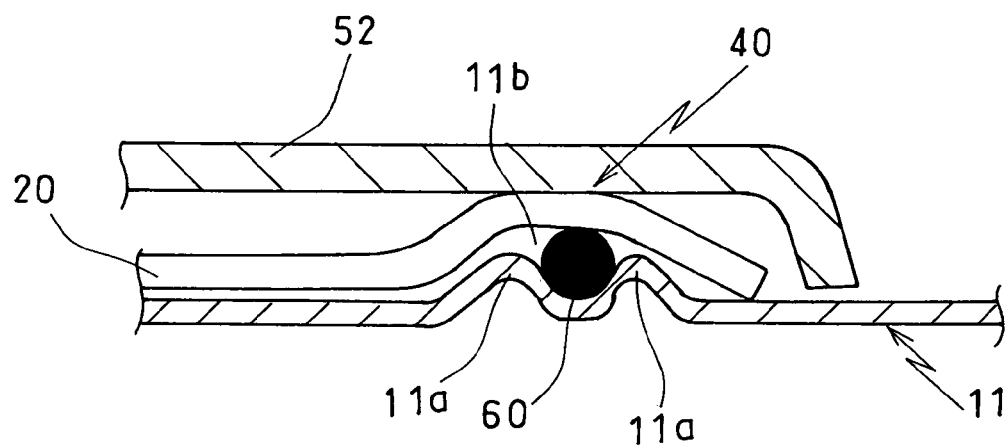
FIG. 2 is a primary portion of a car door structure according to a second preferred embodiment of the invention, and is a drawing corresponding to a sectional view along line II—II in FIG. 4.
Figure 3:
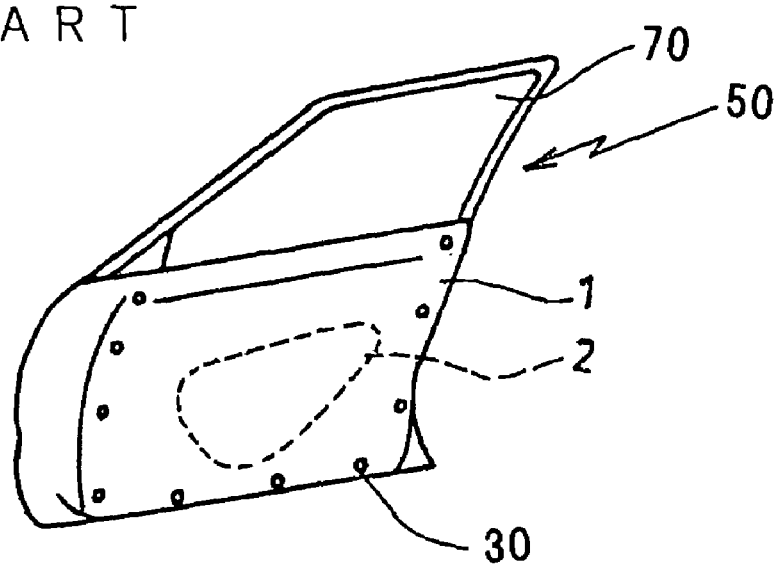
FIG. 3 is an outlook of a car door structure according to a prior art.

A car door structure according to a second preferred embodiment of the invention will be described hereinafter referring to FIG. 2. FIG. 2 shows a portion of the car door structure, and is a drawing corresponding to a sectional view along line II—II in FIG. 4.

The car door structure according to the second embodiment of the invention is such that the nip portion 40 comprises two protrusions 11a, 11a, which are formed by protruding a portion, which faces to the edge portion of the noise isolation sheet 20, of the door inner panel 11 toward the side of the door trim 52, and a concave 11b which is placed at the middle of the protrusions 11a, 11a. A non-drying sealer 60 which adheres to the noise isolation sheet 20 is fixedly adhered to the concave 11b.

In this car door structure like the previous embodiment of the structure, the edge portion of the noise isolation sheet 20 can be nipped firmly by the nip portion 40 by merely installing the door trim 52 to the door inner panel 11. Further, this structure comprises two protrusions 11a, 11a, so that the noise isolation sheet 20 can be nipped more firmly. Moreover, the non-drying sealer 60 adheres to the noise isolation sheet 20, so that the sheet 20 can be installed more firmly.

The noise isolation sheet 20 according to the second embodiment of the invention is made of a sponge sheet of low density having a density, for example, of 0.10 to 0.15, provided with noise isolating properties and water proof properties. Therefore, the structure performs the noise isolating effect and waterproof effect as well.

Further, the non-drying sealer 60 is fixedly adhered to the concave 11b, so that the sealer 60 does not move, and that the edge portion of the noise isolation sheet 20 can be installed accurately to the door inner panel 11.

We claim:

1. A car door structure comprising an interior door trim at an interior side of a door inner panel, and a noise isolation sheet installed between said door inner panel and said door trim, covering partially or wholly said door inner panel wherein, the edge portion of said noise isolation sheet is nipped by a nip portion;

said nip portion is formed with portions of said door inner panel and said door trim by bringing said portions closer;

2. A car door structure claimed in claim 1 wherein said nip portion comprises a protrusion;

and, said protrusion is formed by protruding a portion of said door inner panel toward a side of said door trim.

3. A car door structure claimed in claim 1, wherein said nip portion comprises two protrusions and a concave positioned at a middle of said two protrusions;

and, said two protrusions are formed by protruding a portion of said door inner panel toward a side of said door trim forming a rough wave shape.

4. A car door structure claimed in claim 1, wherein said nip portion comprises two protrusions and a concave positioned at a middle of said two protrusions;

said two protrusions are formed by protruding a portion of said door inner panel toward a side of said door trim forming a rough wave shape;

and, a non-drying sealer to be adhered to said noise isolation sheet is fixedly adhered to said concave.

5. A car door structure claimed in claim 1, wherein said noise isolation sheet is a sponge sheet of low density provided with noise isolating effect and waterproof effect.

6. A car door structure claimed in claim 2, wherein said noise isolation sheet is a sponge sheet of low density provided with noise isolating effect and waterproof effect.

7. A car door structure claimed in claim 3, wherein said noise isolation sheet is a sponge sheet of low density provided with noise isolating effect and waterproof effect.

8. A car door structure claimed in claim 4, wherein said noise isolation sheet is a sponge sheet of low density provided with noise isolating effect and waterproof effect.

* * * * *

UNITED STATES PATENT AND TRADEMARK OFFICE
CERTIFICATE OF CORRECTION

| | | |
|---|---|---|
| PATENT NO. | : 6,979,048 B2 | Page 1 of 1 |
| APPLICATION NO. | : 10/887712 | |
| DATED | : December 27, 2005 | |
| INVENTOR(S) | : Masami Isobe and Shinichiro Emori | |

It is certified that error appears in the above-identified patent and that said Letters Patent is hereby corrected as shown below:

Column 2, line 22, "density" should read --specific gravity--.

Column 3, lines 9 and 46, "density," each occurrence, should read --specific gravity--.

Column 4, line 53, "density," each occurrence, should read --specific gravity--.

Column 5, line 16, "density," each occurrence, should read --specific gravity--.

Column 6, line 21
Claim 5, line 2, "density" should read --specific gravity--.

Column 6, line 24
Claim 6, line 2, "density" should read --specific gravity--.

Column 6, line 27
Claim 7, line 2, "density" should read --specific gravity--.

Column 6, line 31
Claim 8, line 2, "density" should read --specific gravity--.

Signed and Sealed this

Twenty-fourth Day of April, 2007

JON W. DUDAS
*Director of the United States Patent and Trademark Office*